W. J. CLUTS.
GATE OR DOOR LATCH.
APPLICATION FILED APR. 30, 1917.
1,234,132.
Patented July 24, 1917.
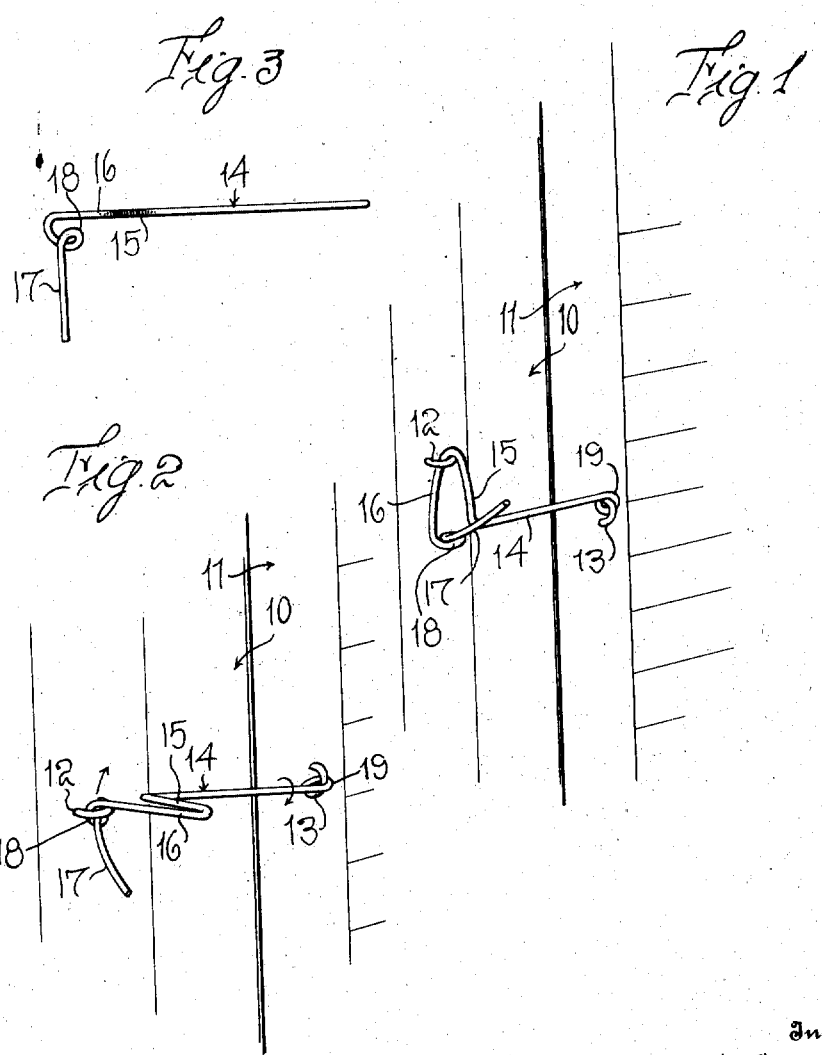
Inventor
WILLIAM J. CLUTS
By Watson E. Coleman
Attorney

UNITED STATES PATENT OFFICE.

WILLIAM J. CLUTS, OF VIENNA, SOUTH DAKOTA.

GATE OR DOOR LATCH.

1,234,132.  Specification of Letters Patent.  Patented July 24, 1917.

Application filed April 30, 1917. Serial No. 165,557.

*To all whom it may concern:*

Be it known that WILLIAM J. CLUTS, a citizen of the United States, residing at Vienna, in the county of Clark and State of South Dakota, has invented certain new and useful Improvements in Gate or Door Latches, of which the following is a specification, reference being had to the accompanying drawings.

This invention relates to latches for gates, doors, and other closures, and particularly to latches of that character in which one element of the latch comprises a hook and the other element an eye.

The general object of the invention is the provision of a latch of a very simple construction, which cannot be opened accidentally by stock.

A further object is to provide a hook-like latch of this character, which can only be detached from the eye by a plurality of movements in different directions, the mere initial lifting of the hook with relation to the eye not availing to detach the hook from its engagement with the eye, the detachment of the hook from the eye requiring that a series of different but simple movements of the latch be performed in order to unlock the latch.

Other objects will appear in the course of the following description.

My invention is illustrated in the accompanying drawings, wherein:—

Figure 1 is a perspective view of a door and corresponding jamb, with my improved latch attached thereto and in locking position;

Fig. 2 is a like view to Fig. 1, but showing the latch rotated so that it may be disengaged from the eye 12;

Fig. 3 is a top plan view of the latching hook.

Referring to these drawings, 10 designates a door or gate or like element, and 11 designates the jamb with which the gate or door coacts. The door is provided with an eye 12 and the jamb is shown as provided with an eye 13, which is disposed in a vertical plane. The latch comprises a generally hook-shaped shank designated 14 which is straight for a portion of its length, then is bent upward as at 15, then bent downward as at 16 at an acute angle and then extended outward as at 17. Preferably at the base of this outward extension 17 there is provided an inwardly projecting protuberance 18, which may be conveniently formed by bending the wire or other material from which the latch is made upon itself to provide a loop.

It will be seen that the eye 13 extends in a vertical plane and hence the shank 14, which at its end adjacent the eye is formed with a small loop or eye 19, may be turned in a plane parallel to the plane of the eye 13, and that the hook 14 may also be swung upward upon the eye 13. When the device is in use, the hook is engaged with the eye 12 in the manner illustrated in Fig. 1, so that the apex of the hook is disposed against the eye 12 and the extension 17 projects outward approximately at right angles to the face of the door, gate or other structure. Now if it be desired to open the door or gate, the hook is forced upward until the protuberance 18 strikes the eye. Then the extension 17 is pressed down, which will rotate the shank 14, so that the parts will be in the position shown in Fig. 2. The extension 17 will then be in line with the eye 12 and the hook may be pushed upward until the hook is disengaged from the eye. A reverse movement, of course, will engage the hook with the eye.

The extension 17 preferably projects upward and outward so that it forms an effective means for rotating the hook upon its pivotal point 13. The protuberance 18, when the hook is half raised, will tend to prevent the upward movement of the hook unless the hook is shifted slightly laterally. The hook need not, however, be formed with this protuberance 18.

It will be seen that this device is very cheap, may be easily applied and it has been found to be very effective in practice. Stock may rub against this hook, but cannot unfasten the door for the reason that merely pushing upward on the hook does not act to rotate the hook into such a position as will permit the arm or extension 17 to pass through the latch. Inasmuch as this arm or extension 17 is turned upward, pressure upon it will tend to force the V-shaped portion of the hook against the door and will not tend to turn the hook to a position which will bring the arm or extension in line with the axis of the eye 12. Of course while this latch is particularly adapted for barns, outhouses, gates, etc., where cattle are confined, yet it may be used under other circumstances and wherever it is applicable. It will be seen that while the loop 18 is primarily for the purpose of obstructing the easy detachment of the latch from the eye 12 that it may be also used for engaging a pad lock to thereby prevent the disengagement of the latch from the eye 12.

Having described my invention, what I claim is:—

1. The combination with a swinging element and a fixed element, of a latch therefor comprising a shank swingingly mounted on one of said elements for vertical movement and a rotary movement in a horizontal plane, the extremity of the shank being formed with an upwardly bowed hook, and the extremity of the bill of the hook having an outerward extension, the other element being provided with an eye with which the bill of the hook is adapted to engage.

2. The combination with a fixed and a swinging element, of a latching device therefor comprising an eye on one of said elements and a shank loosely connected to the other of said elements for movement in a plurality of planes, said shank having an upwardly extending V-shaped portion forming a hook and having an outwardly extending arm at the termination of the bill of said hook, said shank being formed with a loop forming an inwardly projecting protuberance and disposed at the junction of the arm with the bill of the hook.

3. The combination with a fixed and a swinging element, of a latching device therefor comprising an eye on one of said elements and a shank loosely connected to the other of said elements for movement in a plurality of planes, said shank having an upwardly extending V-shaped portion forming a hook and having an outwardly extending arm at the termination of the bill of said hook, said arm being upwardly and outwardly extended, there being an inwardly projecting protuberance at the junction of said arm with the bill of the hook.

In testimony whereof I hereunto affix my signature in the presence of two witnesses.

WILLIAM J. CLUTS.

Witnesses:
G. I. MINOR,
A. P. LUNDE.

Copies of this patent may be obtained for five cents each, by addressing the "Commissioner of Patents, Washington, D. C."